US012669218B2

(12) United States Patent
Tomi et al.

(10) Patent No.: US 12,669,218 B2
(45) Date of Patent: Jun. 30, 2026

(54) HYDROGEN SUPPLY SYSTEM

(71) Applicant: TOYOTA JIDOSHA KABUSHIKI KAISHA, Toyota (JP)

(72) Inventors: Naoki Tomi, Kawasaki (JP); Yoshikatsu Fujimura, Toyota (JP); Tetsuya Tonosako, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/180,591

(22) Filed: Apr. 16, 2025

(65) Prior Publication Data

US 2026/0160390 A1 Jun. 11, 2026

(30) Foreign Application Priority Data

Jul. 19, 2024 (JP) ................................ 2024-115476

(51) Int. Cl.
*F17C 7/00* (2006.01)

(52) U.S. Cl.
CPC ........ *F17C 7/00* (2013.01); *F17C 2205/0323* (2013.01); *F17C 2221/012* (2013.01); *F17C 2250/03* (2013.01); *F17C 2250/043* (2013.01); *F17C 2260/036* (2013.01); *F17C 2265/066* (2013.01); *F17C 2270/0105* (2013.01); *F17C 2270/0134* (2013.01); *F17C 2270/0173* (2013.01); *F17C 2270/0178* (2013.01); *F17C 2270/0189* (2013.01)

(58) Field of Classification Search
CPC ................ F17C 7/00; F17C 2205/0323; F17C 2221/012; F17C 2250/03; F17C 2250/043; F17C 2260/036; F17C 2265/066; F17C 2270/0105; F17C 2270/0134; F17C 2270/0173; F17C 2270/0178; F17C 2270/0189; B67D 7/3218; B67D 7/3209
USPC ...................................................... 141/311 R
See application file for complete search history.

(56) References Cited

U.S. PATENT DOCUMENTS

2023/0110816 A1* 4/2023 Mei ..................... H01M 16/006
429/454
2024/0209989 A1* 6/2024 Hotta .................... F17C 13/025

FOREIGN PATENT DOCUMENTS

JP 2023-056947 A 4/2023

* cited by examiner

*Primary Examiner* — Christopher M Afful
(74) *Attorney, Agent, or Firm* — SoraIP, Inc.

(57) ABSTRACT

A hydrogen supply system including: an attachable and detachable hydrogen tank; a hydrogen consumption device that consumes hydrogen of the hydrogen tank; and a control device is provided. The hydrogen consumption device includes an attaching-detaching mechanism that attaches and detaches the hydrogen tank with respect to the hydrogen consumption device. The attaching-detaching mechanism includes a motor that controls attaching and detaching of the hydrogen tank with respect to the hydrogen consumption device, and a hydrogen tank biasing mechanism that transmits a biasing force to the hydrogen tank. The control device performs stop control of stopping control of the motor of the attaching-detaching mechanism when abnormality is sensed in at least one of the hydrogen tank and the hydrogen consumption device in a state in which the hydrogen tank is connected to the hydrogen consumption device and the hydrogen is supplied from the hydrogen tank to the hydrogen consumption device.

5 Claims, 5 Drawing Sheets

HYDROGEN SUPPLY SYSTEM

CROSS-REFERENCE TO RELATED APPLICATION

This application claims priority to Japanese Patent Application No. 2024-115476 filed on Jul. 19, 2024. The disclosure of the above-identified application, including the specification, drawings, and claims, is incorporated by reference herein in its entirety.

BACKGROUND

1. Technical Field

The present disclosure relates to a hydrogen supply system.

2. Description of Related Art

Japanese Unexamined Patent Application Publication No. 2023-056947 (JP 2023-056947 A) discloses a moving body having attachable and detachable hydrogen tanks mounted thereon.

SUMMARY

In the related art, in a hydrogen supply system, when abnormality such as emergency stop or unintended power shutdown occurs in any one of a hydrogen tank and a hydrogen consumption device, unless the hydrogen tank and the hydrogen consumption device are disconnected, the hydrogen tank is continuously connected to a hydrogen pipe, and hydrogen continuously leaks at the time of hydrogen leakage. Further, even when the hydrogen tank and the hydrogen consumption device are disconnected, residual hydrogen on the hydrogen tank downstream may leak.

The present disclosure has been made in view of the above-mentioned circumstance, and has a primary object to provide a hydrogen supply system capable of preventing hydrogen leakage.

That is, the present disclosure includes the following aspects.

<1> A first aspect of the disclosure relates to a hydrogen supply system including: a hydrogen tank that is attachable and detachable; a hydrogen consumption device that consumes hydrogen of the hydrogen tank; and a control device.

The hydrogen consumption device includes an attaching-detaching mechanism that attaches and detaches the hydrogen tank with respect to the hydrogen consumption device.

The attaching-detaching mechanism includes a motor that controls attaching and detaching of the hydrogen tank with respect to the hydrogen consumption device, and a hydrogen tank biasing mechanism that transmits a biasing force to the hydrogen tank.

The control device performs stop control of stopping control of the motor of the attaching-detaching mechanism when abnormality is sensed in at least one of the hydrogen tank and the hydrogen consumption device in a state in which the hydrogen tank is connected to the hydrogen consumption device and the hydrogen is supplied from the hydrogen tank to the hydrogen consumption device.

<2> In the hydrogen supply system according to <1>, the attaching-detaching mechanism may include a lock portion that latches the hydrogen tank at a predetermined position when movement of the hydrogen tank is restricted.

The control device may perform lock control of bringing the hydrogen tank to a lock state by the lock portion when the abnormality is sensed in at least one of the hydrogen tank and the hydrogen consumption device.

The control device may perform the stop control after performing the lock control.

<3> In the hydrogen supply system according to <2>, the attaching-detaching mechanism may include an attaching-detaching unit that allows the hydrogen tank to be attached and detached.

The attaching-detaching unit may include a movable portion that moves the hydrogen tank through control of the motor, and a fitting portion to be fitted to the hydrogen tank.

The movable portion may include an engagement recessed portion engageable with the lock portion.

The lock portion may be a lock pin.

<4> In the hydrogen supply system according to <3>, the hydrogen tank may include a first connection portion.

The fitting portion may include a second connection portion.

At the time of fitting the hydrogen tank to the fitting portion, the first connection portion of the hydrogen tank and the second connection portion of the fitting portion may be connected.

<5> In the hydrogen supply system according to <4>, the first connection portion may be an on-off valve.

The second connection portion may be a push rod.

The hydrogen supply system of the present disclosure can prevent hydrogen leakage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
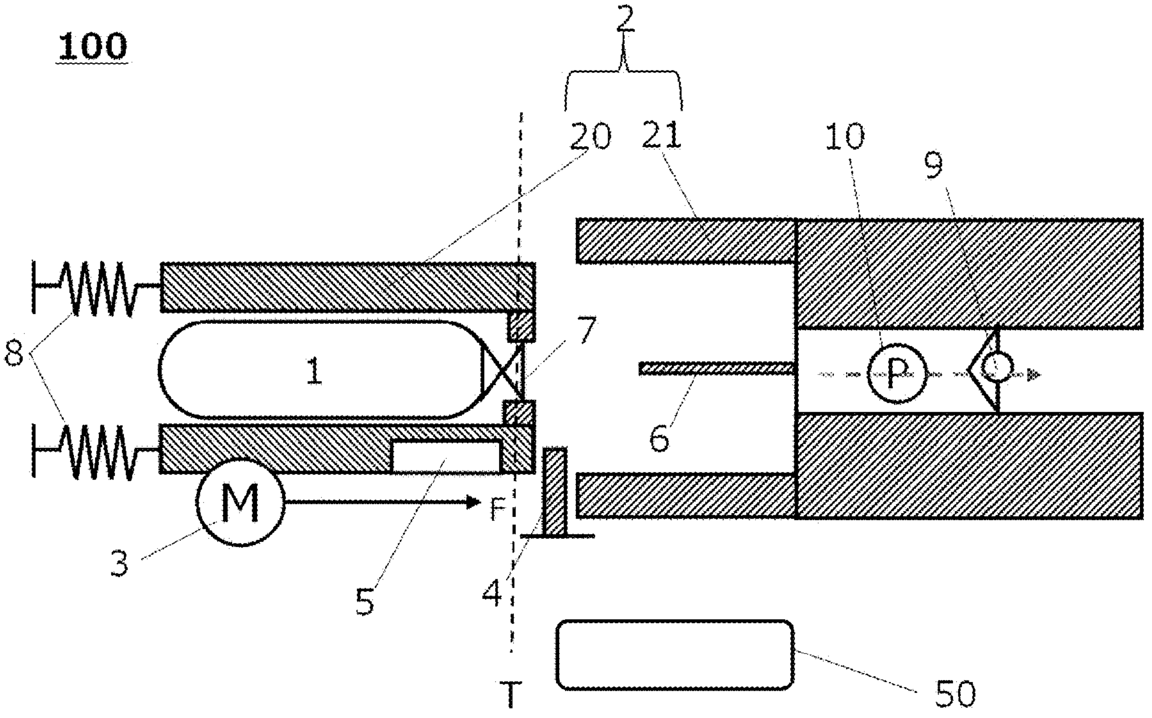
FIG. 1 is a view illustrating an example of a configuration of a hydrogen supply system of the present disclosure.

The present disclosure provides a hydrogen supply system including: a hydrogen tank that is attachable and detachable; a hydrogen consumption device that consumes hydrogen of the hydrogen tank; and a control device. The hydrogen consumption device includes an attaching-detaching mechanism that attaches and detaches the hydrogen tank with respect to the hydrogen consumption device. The attaching-detaching mechanism includes a motor that controls attaching and detaching of the hydrogen tank with respect to the hydrogen consumption device, and a hydrogen tank biasing mechanism that transmits a biasing force to the hydrogen tank. The control device performs stop control of stopping control of the motor of the attaching-detaching mechanism when abnormality is sensed in at least one of the hydrogen tank and the hydrogen consumption device in a state in which the hydrogen tank is connected to the hydrogen consumption device and the hydrogen is supplied from the hydrogen tank to the hydrogen consumption device.

The hydrogen supply system of the present disclosure includes a hydrogen tank that is attachable and detachable, a hydrogen consumption device that consumes hydrogen of the hydrogen tank, and a control device.

The hydrogen supply system of the present disclosure may be used in a moving body such as a vehicle, a railway vehicle, a ship, or an aircraft, or a stationary power generation system such as a fuel cell power generator. Examples of the vehicle include a fuel cell electric vehicle and a hydrogen engine vehicle.

Hydrogen Tank

The hydrogen tank (hereinafter sometimes referred to as "tank") is a container that stores hydrogen, and hydrogen is supplied from the hydrogen tank to the hydrogen consumption device. The hydrogen supply system includes a plurality of (n) hydrogen tanks. It is sufficient that n is an integer of 2 or more, and particularly has no upper limit.

It is sufficient that the hydrogen tank has an attachable and detachable configuration, and a publicly-known configuration that can be used as the hydrogen tank is applicable.

The hydrogen tank includes a hydrogen tank main body that is a part that stores the hydrogen, and a hydrogen supply port that is an inlet or outlet of the hydrogen of the hydrogen tank main body.

The hydrogen tank may include a first connection portion (a connection portion on the hydrogen tank side) to be connected to the hydrogen consumption device.

The first connection portion includes the hydrogen supply port.

The first connection portion may be an on-off valve (that is sometimes referred to as "tank shut valve") or the like.

The on-off valve may include a valve body and the hydrogen supply port.

The valve body is a valve that switches permission and restriction of communication between inside and outside of the hydrogen tank. The valve body is biased so as to restrict the communication when the valve is closed, and the communication is permitted when the valve body is moved by pressing the valve body against a biasing force. In order to permit and restrict the communication by pressing the valve body and canceling the pressing, the hydrogen consumption device may include a push rod as means for pressing the valve body.

The push rod is to be inserted to the hydrogen supply port.

The hydrogen tank may be provided with a handle to be grasped when the hydrogen tank is attached to or detached from the hydrogen consumption device.

Hydrogen Consumption Device

The hydrogen consumption device is a device that is a hydrogen supply destination of the hydrogen tank. The hydrogen consumption device receives the hydrogen and consumes the received hydrogen.

The hydrogen consumption device includes an attaching-detaching mechanism that attaches and detaches the hydrogen tank with respect to the hydrogen consumption device. The attaching-detaching mechanism includes at least one motor and a hydrogen tank biasing mechanism that transmits a biasing force to the hydrogen tank.

The motor controls attaching and detaching of the hydrogen tank with respect to the hydrogen consumption device. The hydrogen consumption device may include a plurality of (n) motors corresponding to the attaching and detaching of the respective plurality of (n) hydrogen tanks.

The motor may directly transmit a drive force of the motor to the hydrogen tank, or may transmit the drive force of the motor to a movable portion of an attaching-detaching unit.

The motor may be a stepping motor.

The stepping motor is a motive power source that moves the movable portion via a gear. The specific aspect of the stepping motor is not particularly limited, and a publicly-known stepping motor can be used.

The stepping motor is electrically connected to the control device, and a rotation angle and a rotation speed are controlled based on a signal from the control device. In this manner, the movement of the movable portion is accurately controlled.

The stepping motor may include a sensor such as a position sensor, a motor torque sensor, or a motor temperature sensor.

The position sensor detects the position of the hydrogen tank, in particular, the position of the on-off valve. The position sensor may sense the position of the on-off valve based on the rotation angle of the stepping motor detected by the motor torque sensor, or may detect the position of the on-off valve based on the temperature of the stepping motor detected by the motor temperature sensor.

The specific aspect of the sensor is not particularly limited, and a publicly-known sensor can be used. The sensor is electrically connected to the control device, and is configured to be capable of transmitting a signal indicating the measured position of the hydrogen tank to the control device.

The attaching-detaching mechanism includes a hydrogen tank biasing mechanism.

The hydrogen tank biasing mechanism means a mechanism having a biasing force for moving, in a free state not affected by other external forces, the hydrogen tank from a position (a hydrogen supply start position) at which the first connection portion of the hydrogen tank is connected to a second connection portion of the hydrogen consumption device to a predetermined position (a hydrogen supply standby position) in a direction in which the first connection portion of the hydrogen tank is separated from the second connection portion of the hydrogen consumption device.

The hydrogen tank biasing mechanism may be a mechanism that directly transmits the biasing force of the biasing mechanism to the hydrogen tank, or may be a spring or the like. The hydrogen tank biasing mechanism may be a configuration in which a spring is attached to the hydrogen tank, or a configuration in which a spring is attached to the movable portion.

The attaching-detaching mechanism may include an attaching-detaching unit (attaching portion) that allows the hydrogen tank to be attached or detached.

The attaching-detaching unit may include a fitting portion and the movable portion.

The fitting portion is to be fitted to the hydrogen tank. It is sufficient that the fitting portion is fitted to at least an end portion of the hydrogen tank on the hydrogen supply port side in a state in which the hydrogen tank is attached to the attaching-detaching unit. The fitting portion may be fitted to the entire hydrogen tank, or may be fitted to also an end portion of the movable portion on a side facing the fitting portion.

At the time of fitting the hydrogen tank to the fitting portion, the first connection portion of the hydrogen tank and the second connection portion of the fitting portion are connected.

The hydrogen consumption device may include the second connection portion (a connection portion on the hydrogen consumption device side).

The second connection portion is a portion to be connected to the first connection portion of the hydrogen tank and forming a flow path (communication) to the hydrogen tank. The second connection portion may be provided on the fitting portion of the attaching-detaching unit. The second connection portion may be a push rod or the like.

The push rod is a member capable of pressing the valve body included in the on-off valve of the hydrogen tank. The push rod may have a bar shape, and may press the valve body at its distal end. The push rod may be configured to be insertable to the hydrogen supply port of the on-off valve.

Further, the push rod may be configured to form, when the push rod presses the valve body to bring the on-off valve to an open state, a flow path so that the hydrogen flows to a supply flow path from the inside of the hydrogen tank.

The attaching-detaching mechanism may include a lock portion that latches (locks) the hydrogen tank at a predetermined position when the movement of the hydrogen tank is restricted.

The predetermined position may be the hydrogen supply start position, or may be the hydrogen supply standby position.

The lock portion latches the hydrogen tank at the predetermined position in lock control to achieve a lock state of restricting the movement of the hydrogen tank, and cancels the latching in unlock control to bring the hydrogen tank to an unlock state of permitting the movement of the hydrogen tank.

The lock portion is electrically connected to the control device, and the control device drives the lock portion based on an input signal to switch the lock portion between the lock state of restricting the movement of the hydrogen tank and the unlock state of permitting the movement of the hydrogen tank.

The lock portion may be a lock pin or the like.

The lock pin may be disposed on the fitting portion.

The lock pin is a pin disposed to be projectable to and retractable from an engagement recessed portion of the movable portion. At the time of projection, the lock pin can enter the inner side of the engagement recessed portion to be engaged with the engagement recessed portion. Meanwhile, at the time of retraction, the lock pin is disposed so as not to be engaged with the engagement recessed portion.

The lock pin is electrically connected to the control device, and the projection and the retraction of the lock pin are controlled based on a signal from the control device.

The movable portion moves the hydrogen tank through the control of the motor. The movable portion moves in directions in which the first connection portion of the hydrogen tank approaches and separates away from the second connection portion of the hydrogen consumption device. With the movable portion, the hydrogen tank is moved among a hydrogen supply stop position, the hydrogen supply standby position, and the hydrogen supply start position.

The movable portion may include a tank insertion hole.

The tank insertion hole is a space in which the hydrogen tank is accommodated. The tank insertion hole may include an opening through which the hydrogen tank can be taken in or out, and may be a space surrounded by an inner wall.

The movable portion may include an engagement recessed portion (a positioning hole) that can be engaged with the lock portion.

The engagement recessed portion may be provided on the lower surface side of the movable portion. As long as the engagement recessed portion is configured such that the lock pin is engageable and separable, the specific form of the engagement recessed portion is not particularly limited, and the engagement recessed portion may be a dent or have a groove shape.

The width (the size in a direction in which the movable portion moves) of the engagement recessed portion may be larger than the width of the lock pin. In this manner, even in a state in which the lock pin projects to enter the inner side of the engagement recessed portion, the movable portion can move within a range of the width of the engagement recessed portion.

The movable portion may be a movable placement stage.

The movable placement stage is a member on which the hydrogen tank can be placed on the upper surface side, and is a member in which, when the movable placement stage includes a tank insertion hole on the upper surface side, the hydrogen tank can be inserted and fixed to the tank insertion hole. The movable placement stage means a stage having a movable property capable of moving, in a state of carrying the hydrogen tank, in a direction in which the first connection portion of the hydrogen tank is connected to the second connection portion of the hydrogen consumption device and a direction in which the first connection portion of the hydrogen tank is detached from the second connection portion of the hydrogen consumption device. Means for performing the movement is not particularly limited, and examples of the means include a combination of a rail and a wheel.

The movable placement stage may be a base stage (a tank placement stage).

The hydrogen consumption device may include hydrogen consumption equipment.

Examples of the hydrogen consumption equipment include a fuel cell, a hydrogen engine, and a combustion unit such as a hydrogen burner.

The hydrogen consumption device may include a supply flow path (a hydrogen pipe).

The supply flow path is configured of a pipe that is a path that guides the hydrogen from the hydrogen tank to the hydrogen consumption equipment. The supply flow paths extending from the respective hydrogen tanks may be joined to form one supply flow path to be connected to the hydrogen consumption equipment.

The hydrogen consumption device may include an injection.

The injection is disposed in a supply flow path between the second connection portion and the hydrogen consumption equipment to control supply of the hydrogen to the hydrogen consumption equipment. Examples of the injection include a check valve and a flow regulating valve.

The hydrogen consumption device may include a pressure gauge.

The pressure gauge may be provided on each supply flow path so as to correspond to an inner pressure of each hydrogen tank, and may measure a flow path inner pressure (a pressure in the pipe) of each supply flow path.

The pressure gauge is configured to be capable of transmitting obtained pressure value data to the control device.

In the hydrogen consumption device, the inserting and fixing of the hydrogen tank, the attaching of the hydrogen tank, the detaching of the hydrogen tank, and the like are performed.

The inserting and fixing (setting) of the hydrogen tank means operation of disposing the hydrogen tank at a position (the hydrogen supply stop position) from which the attaching of the hydrogen tank is started. Specifically, the inserting and fixing (setting) of the hydrogen tank may be operation performed by, for example, manual work of human from the outside of the hydrogen supply system to insert and fix the hydrogen tank to the hydrogen insertion hole of the movable portion of the attaching-detaching unit of the attaching-detaching mechanism of the hydrogen consumption device.

The attaching of the hydrogen tank means operation of connecting the hydrogen tank and the hydrogen consumption device in a state in which the hydrogen tank is allowed to supply the hydrogen to the hydrogen consumption device. Specifically, the attaching of the hydrogen tank means operation of moving the hydrogen tank from the hydrogen supply stop position to a position (the hydrogen supply standby position) at which accurate positioning is started in order to connect the first connection portion of the hydrogen tank and the second connection portion of the hydrogen consumption device, and further moving the hydrogen tank from the hydrogen supply standby position to a position (the hydrogen supply start position) at which the first connection portion of the hydrogen tank and the second connection portion of the hydrogen consumption device are connected, thereby connecting the pair of connection portions to each other.

The detaching of the hydrogen tank means operation of disconnecting the first connection portion of the hydrogen tank and the second connection portion of the hydrogen consumption device, and moving the hydrogen tank from the hydrogen supply start position to the hydrogen supply standby position and operation of moving the hydrogen tank from the hydrogen supply standby position to the hydrogen supply stop position in order to make it possible to take out the hydrogen tank.

The hydrogen supply stop position is a position from which the attaching of the hydrogen tank to the hydrogen consumption device is started, and a position at which the hydrogen tank can be taken out. Specifically, the hydrogen supply stop position is a position at which, by, for example, manual work of human from the outside of the hydrogen supply system, the hydrogen tank is inserted and fixed to the hydrogen insertion hole of the movable portion of the attaching-detaching unit of the attaching-detaching mechanism of the hydrogen consumption device. The hydrogen supply stop position may be a position separated from the fitting portion of the attaching-detaching unit than the hydrogen supply standby position. Specifically, the hydrogen supply stop position may be a position at which the first connection portion of the hydrogen tank and the second connection portion of the hydrogen consumption device are not connected and the movable portion and the fitting portion are not in contact, and thus the lock by the lock pin cannot be performed. The position at which the lock by the lock pin cannot be performed means a position at which, in a movable direction of the movable portion of the attaching-detaching unit, a distance from the push rod to the engagement recessed portion of the movable portion is larger than a distance from the push rod to the lock pin.

It is sufficient that the hydrogen supply standby position is a position at which the hydrogen tank and the hydrogen consumption device are not connected in the state in which the hydrogen tank is allowed to supply the hydrogen to the hydrogen consumption device and the hydrogen tank stands by for supply of the hydrogen. The hydrogen supply standby position may be a position at which the first connection portion of the hydrogen tank and the second connection portion of the hydrogen consumption device are not connected, for example, a position at which, through control of the motor, accurate positioning for connecting the first connection portion of the hydrogen tank and the second connection portion of the hydrogen consumption device is started, specifically, a position at which the first connection portion of the hydrogen tank and the second connection portion of the hydrogen consumption device are not connected and the movable portion and the fitting portion are in contact, and thus the lock by the lock pin can be performed.

It is sufficient that the hydrogen supply start position is a position at which the hydrogen tank and the hydrogen consumption device are connected in the state in which the hydrogen tank is allowed to supply the hydrogen to the hydrogen consumption device. Specifically, the hydrogen supply start position may be a position at which, through control of the motor, the first connection portion of the hydrogen tank and the second connection portion of the hydrogen consumption device are connected.

Control Device

The control device is a device that performs control or the like in order to connect the hydrogen tank to the hydrogen consumption device. The control device is a device that performs control or the like in order to connect the first connection portion (the on-off valve or the like) of the hydrogen tank to the second connection portion (the push rod or the like) of the hydrogen consumption device. The control device may be configured to be capable of communicating with the lock pin, the stepping motor, various sensors, the injection, and the pressure gauge.

The control device may include a central processing unit (CPU) that is a processor and performs computation, a random access memory (RAM) that functions as a work area, a read-only memory (ROM) that functions as a recording medium, a receiver that is an interface that receives information regardless of wired or wireless into the control device, and a transmitter that is an interface that transmits information regardless of wired or wireless to the outside from the control device.

Thus, the control device may be configured so that the receiver is connected to the various sensors and the pressure gauge to receive information, and the transmitter is connected to the lock pin, the stepping motor, and the injection to transmit signals for actuation of those members.

The control device may be an electronic control unit (ECU) or the like.

The control device may determine presence or absence of the abnormality of each of the hydrogen tank and the hydrogen consumption device in a state in which the hydrogen tank is connected to the hydrogen consumption device and the hydrogen is supplied from the hydrogen tank to the hydrogen consumption device.

The control device performs stop control of stopping attaching-detaching control of the motor of the attaching-detaching mechanism when the abnormality is sensed in at least one of the hydrogen tank and the hydrogen consumption device in the state in which the hydrogen tank is connected to the hydrogen consumption device and the hydrogen is supplied from the hydrogen tank to the hydrogen consumption device.

When the motor of the attaching-detaching mechanism is stopped at the time of the abnormality, the hydrogen tank is moved from the hydrogen supply start position to the hydrogen supply standby position by the biasing force of the hydrogen tank biasing mechanism such as a spring included in the attaching-detaching mechanism. In this manner, the on-off valve is closed, and the hydrogen tank and the hydrogen pipe are disconnected. The hydrogen leakage can be prevented by disconnecting the hydrogen tank and the hydrogen pipe. Residual hydrogen on the hydrogen tank downstream (such as hydrogen present in a space between the fitting portion and the hydrogen tank or the movable portion) is sealed by the fitting portion and the hydrogen tank or the movable portion, and leakage to the atmosphere can be prevented.

Examples of the abnormality include hydrogen leakage from the hydrogen pipe, positional misalignment of the hydrogen tank, emergency stop of the hydrogen consumption equipment or the like, and unintended power shutdown.

As the sensing of the abnormality, for example, the abnormality may be sensed when a hydrogen pressure or a change amount of the hydrogen pressure detected by a pressure sensor is outside of a predetermined range, when the position of the hydrogen tank detected by the position sensor is not the predetermined position, when a torque value of the motor detected by the motor torque sensor exceeds a threshold value, when the temperature of the motor detected by the motor temperature sensor exceeds a threshold value, or when shutdown of electric power is sensed by a power supply monitor.

When the abnormality is sensed in at least one of the hydrogen tank and the hydrogen consumption device, the control device may perform lock control of bringing the hydrogen tank to a lock state by the lock portion, and may perform the stop control of stopping the control of the motor of the attaching-detaching mechanism after performing the lock control.

At the normal time, the hydrogen tank is latched at the predetermined position by the lock control performed by the lock portion, but, at the time of the abnormality, the lock control is immediately carried out again, and then the control of the motor is stopped, thereby being capable of preventing continuation of hydrogen leakage. At the time of the abnormality, the lock control may be performed again while the hydrogen tank is in the lock state, or the lock may be canceled once by unlock control to bring the hydrogen tank to an unlock state and then the hydrogen tank may be brought to the lock state again by the lock control.

The control device performs attaching-detaching control of the hydrogen tank with respect to the hydrogen consumption device.

The attaching-detaching control includes detaching control and attaching control.

The detaching control includes a disconnection step and a separation step.

The disconnection step is a step of moving the hydrogen tank from the hydrogen supply start position to the hydrogen supply standby position with respect to the hydrogen consumption device. With the disconnection step, the hydrogen consumption device and the hydrogen tank are disconnected.

The separation step is a step of moving the hydrogen tank from the hydrogen supply standby position to the hydrogen supply stop position with respect to the hydrogen consumption device. With the separation step, the hydrogen tank is allowed to be taken out from the hydrogen consumption device.

The attaching control includes an approaching step and a connection step.

The approaching step is a step of moving the hydrogen tank from the hydrogen supply stop position to the hydrogen supply standby position with respect to the hydrogen consumption device. With the approaching step, the hydrogen tank is disposed at a position at which the hydrogen tank stands by for the supply of the hydrogen to the hydrogen consumption device.

The connection step is a step of moving the hydrogen tank from the hydrogen supply standby position to the hydrogen supply start position with respect to the hydrogen consumption device. With the connection step, the hydrogen tank and the hydrogen consumption device are connected in the state in which the hydrogen tank is allowed to supply the hydrogen to the hydrogen consumption device.

FIG. 1 is a view illustrating an example of a configuration of the hydrogen supply system of the present disclosure.

A hydrogen supply system 100 illustrated in FIG. 1 includes a hydrogen tank 1, an attaching-detaching unit 2, a stepping motor 3, a lock pin 4, a positioning hole 5, a push rod 6, an on-off valve 7, a spring 8, a check valve 9, a pressure sensor 10, a supply flow path 11, a movable portion 20, a fitting portion 21, and a control device 50. F indicates the positioning direction, and the arrow of the chain line indicates the flow of hydrogen. The hydrogen passes through the supply flow path 11 to be supplied to the hydrogen consumption equipment (not shown).

As illustrated in FIG. 1, the hydrogen tank 1 is disposed at a hydrogen supply stop position T in a state in which the on-off valve 7 of the hydrogen tank 1 and the push rod 6 in the fitting portion 21 of the attaching-detaching unit 2 are not connected and the movable portion 20 and the fitting portion 21 are not in contact, and thus the lock by the lock pin 4 at the positioning hole 5 of the movable portion 20 is not performed.

The hydrogen tank 1 disposed at the hydrogen supply stop position T is in a state in which, at the position from which fitting of the hydrogen tank 1 to the fitting portion 21 of the attaching-detaching unit 2 (attaching to the attaching-detaching unit 2) is started, the hydrogen tank 1 is inserted and fixed to the tank insertion hole of the movable portion 20 of the attaching-detaching unit 2.

The hydrogen supply stop position T is a position at which, in the movable direction of the movable portion 20 of the attaching-detaching unit 2, the distance from the push rod 6 to the positioning hole 5 of the movable portion 20 is larger than the distance from the push rod 6 to the lock pin 4.

Figure 2:
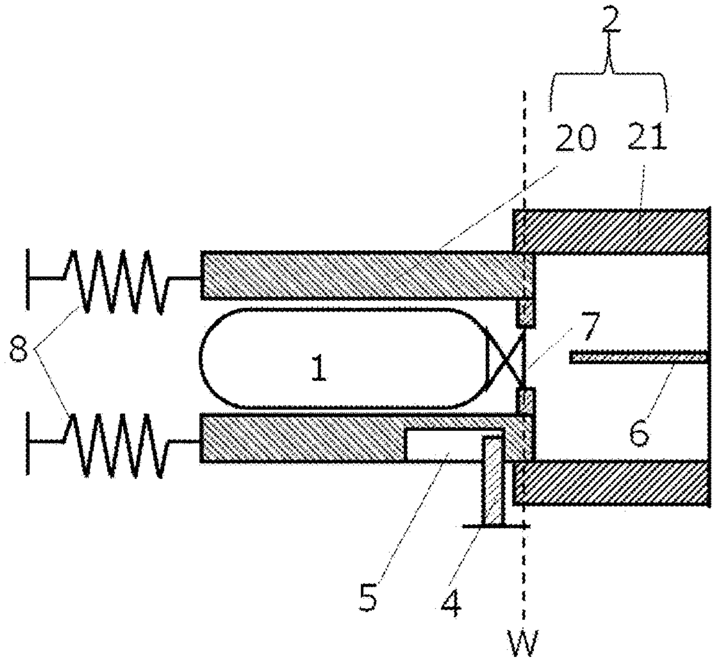
FIG. 2 is a schematic view illustrating an example of a state in which a hydrogen tank is disposed at a hydrogen supply standby position W.

FIG. 2 is a schematic view illustrating an example of a state in which the hydrogen tank is disposed at a hydrogen supply standby position W.

As illustrated in FIG. 2, the hydrogen tank 1 is disposed at the hydrogen supply standby position W in a state in which the on-off valve 7 of the hydrogen tank 1 and the push rod 6 in the fitting portion 21 of the attaching-detaching unit 2 are not connected and the movable portion 20 and the fitting portion 21 are in contact, and thus the lock pin 4 abuts against the positioning hole 5 of the movable portion 20 due to the spring force of the spring 8. The on-off valve 7 of the hydrogen tank 1 is not connected to the push rod 6 in the fitting portion 21 of the attaching-detaching unit 2, and the on-off valve 7 is in a closed state.

The hydrogen tank 1 disposed at the hydrogen supply standby position W is in a state of not being fitted into the fitting portion 21 of the attaching-detaching unit 2 (not being attached to the attaching-detaching unit 2), and is in a state of being detached from the attaching-detaching unit 2.

The state illustrated in FIG. 2 is also a state of the hydrogen tank 1 after the stop control of the present disclosure is performed and emergency stop is performed. In this state, a space that is a portion on the downstream of the hydrogen tank 1 and surrounded by the hydrogen tank 1 and the movable portion 20 and the fitting portion 21 of the attaching-detaching unit 2 is isolated from the atmosphere, and the residual hydrogen in the portion on the downstream of the hydrogen tank 1 does not leak to the atmosphere.

Figure 3:
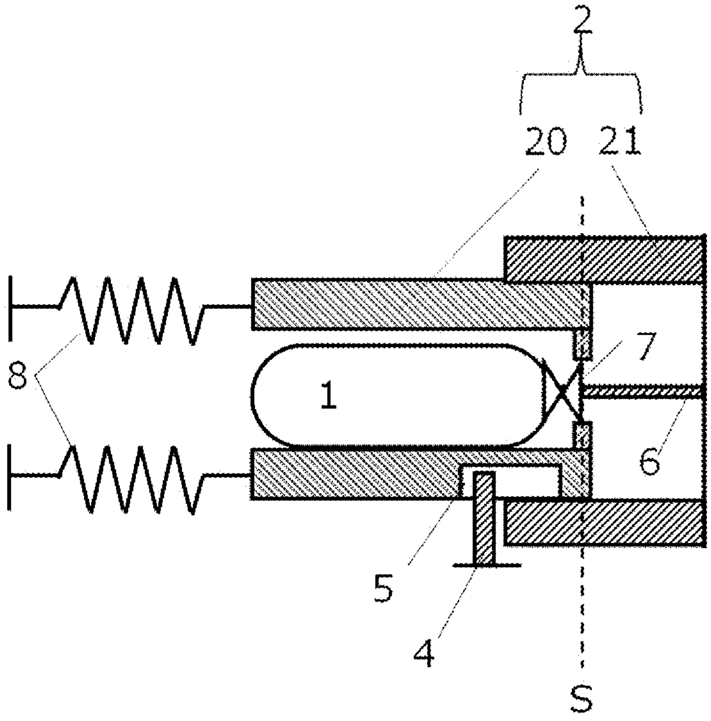
FIG. 3 is a schematic view illustrating an example of a state in which the hydrogen tank is disposed at a hydrogen supply start position S.

FIG. 3 is a schematic view illustrating an example of a state in which the hydrogen tank is disposed at a hydrogen supply start position S.

As illustrated in FIG. 3, the hydrogen tank 1 is disposed at the hydrogen supply start position S in a state in which the on-off valve 7 of the hydrogen tank 1 and the push rod 6 in the fitting portion 21 of the attaching-detaching unit 2 are connected and the lock by the lock pin 4 at the positioning hole 5 of the movable portion 20 is performed. The on-off valve 7 of the hydrogen tank 1 is connected to the push rod 6 in the fitting portion 21 of the attaching-detaching unit 2, and the on-off valve 7 is in an open state.

The hydrogen tank 1 disposed at the hydrogen supply start position S is fitted to the fitting portion 21 of the attaching-detaching unit 2, and is in a state of being attached to the attaching-detaching unit 2.

Figure 4:
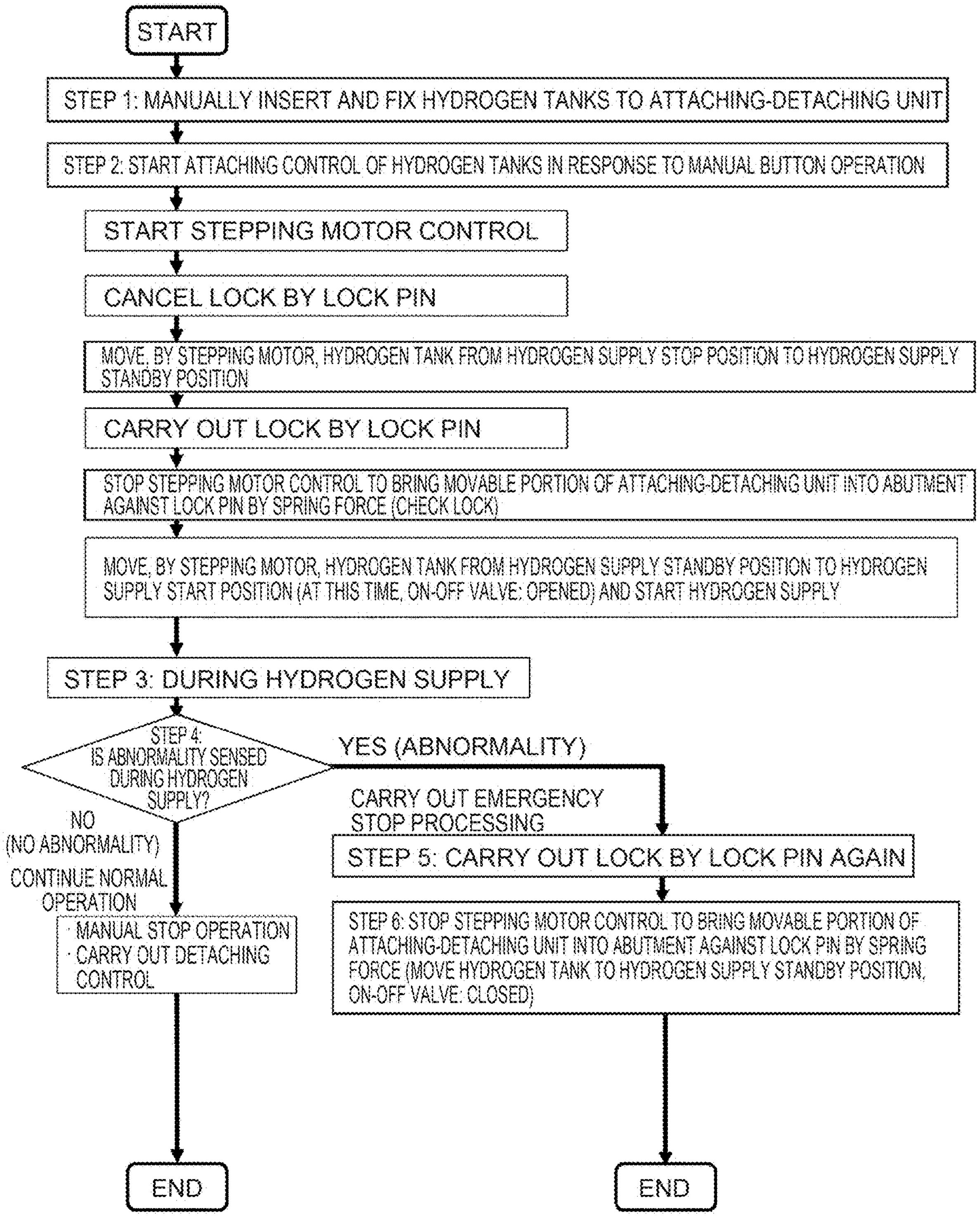
FIG. 4 is a flowchart illustrating an example of control of the present disclosure.

FIG. 4 is a flowchart illustrating an example of control of the present disclosure.

STEP 1: Manually insert and fix hydrogen tank to attaching-detaching unit:

dcm1=dstp

STEP 2: Start attaching control of hydrogen tank in response to manual button operation:

xh2sply=ON

Start stepping motor control:

xmot1=ON

Cancel lock by lock pin:

xlck1=ON

Move, by stepping motor, hydrogen tank from hydrogen supply stop position to hydrogen supply standby position:

dcm1=dstb

Carry out lock by lock pin:

xlck1=OFF

Stop stepping motor control to bring movable portion of attaching-detaching unit into abutment against lock pin by spring force (check lock):

xmot1=OFF

Move, by stepping motor, hydrogen tank from hydrogen supply standby position to hydrogen supply start position (at this time, the on-off valve and the push rod are in contact. The on-off valve is opened by the pressing force applied from the push rod to the on-off valve.) and start hydrogen supply:

xmot1=ON, dcm1=dsply

STEP 3: During hydrogen supply

STEP 4: When no abnormality is sensed during hydrogen supply, continue normal operation (carry out detaching control by manual stop operation). When abnormality is sensed during hydrogen supply, carry out emergency stop processing described below.

STEP 5: Carry out lock by lock pin again:

xlck1=OFF

Figure 5:
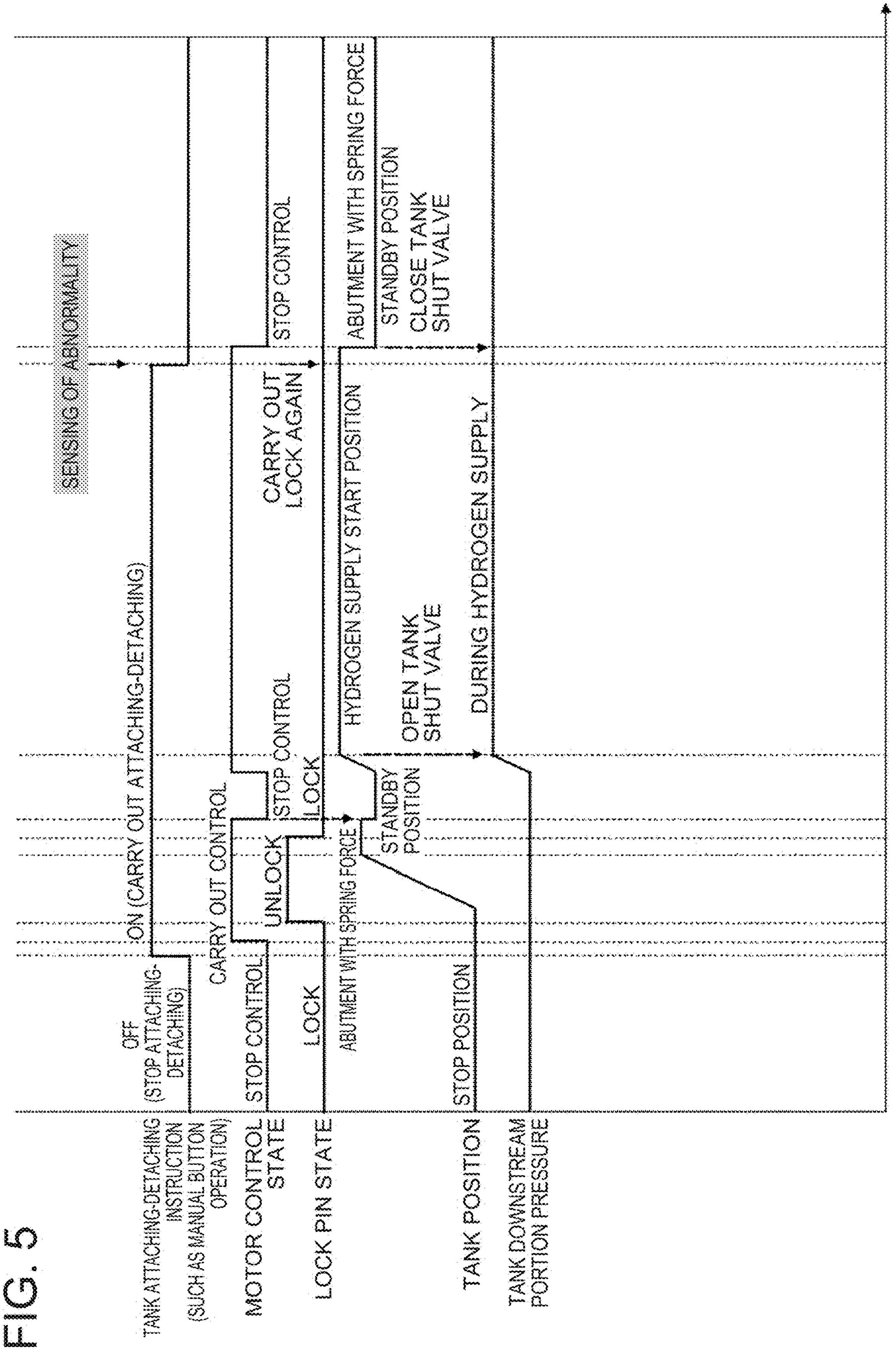
FIG. 5 is a view illustrating an example of a time chart in a case where abnormality of emergency stop is sensed in connection control of the hydrogen tank illustrated in FIG. 4.

STEP 6: Stop stepping motor control to bring movable portion of attaching-detaching unit into abutment against lock pin by spring force (move hydrogen tank to hydrogen supply standby position, on-off valve: closed):

xmot1=OFF dcm1: hydrogen tank position dstp: hydrogen supply stop position dstb: hydrogen supply standby position dsply: hydrogen supply start position xh2sply: hydrogen tank attaching-detaching control instruction xmot1: motor control state ON: control start, OFF: control stop xlck1: lock pin state ON: unlock, OFF: carry out lock FIG. 5 is a view illustrating an example of a time chart in a case where abnormality of emergency stop is sensed in the connection control of the hydrogen tank illustrated in FIG. 4.

At the time of emergency stop, STEP 4 to STEP 6 described above are executed in order.

Figure 6:
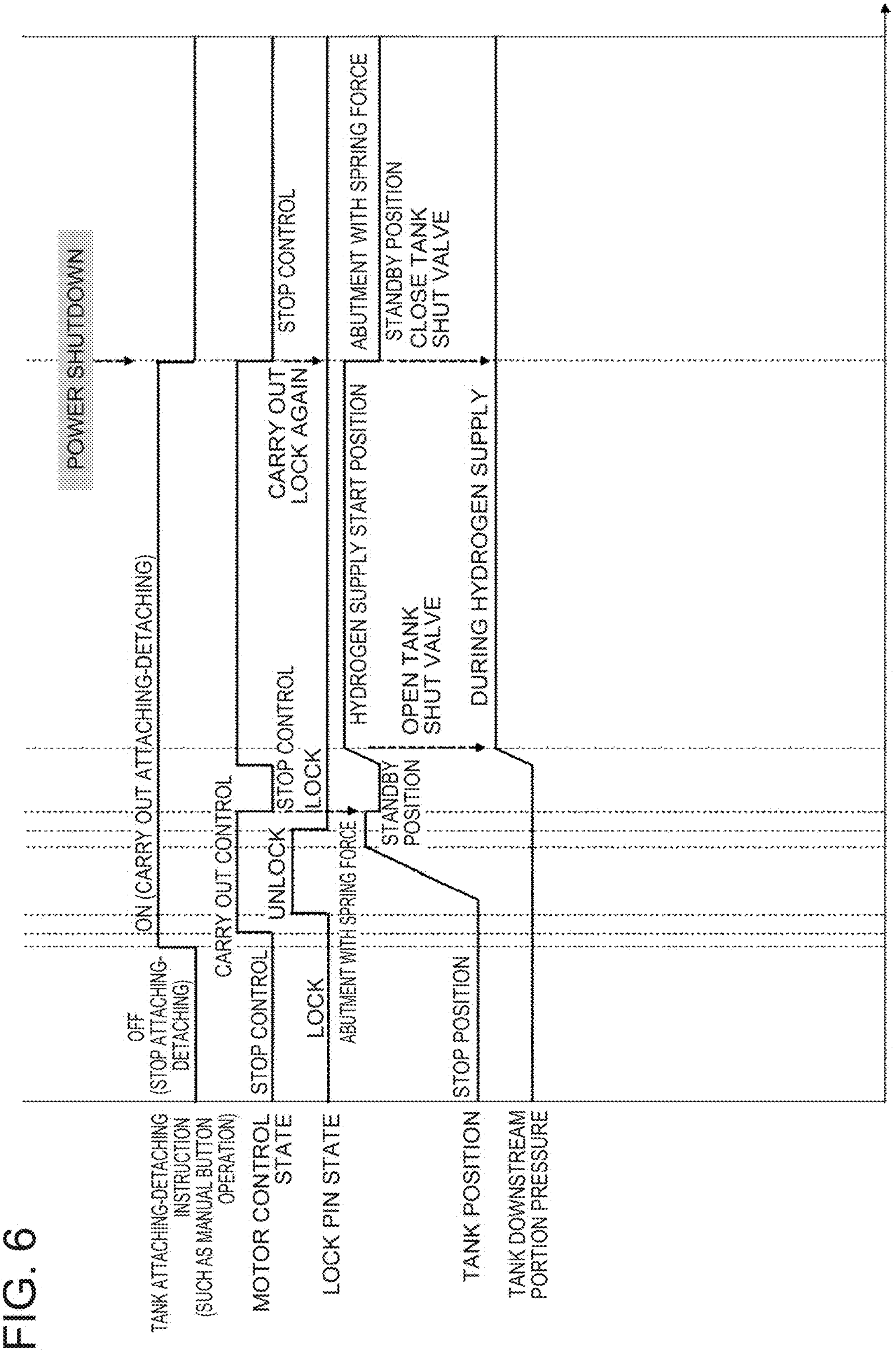
FIG. 6 is a view illustrating an example of a time chart in a case where abnormality of power shutdown is sensed in the connection control of the hydrogen tank illustrated in FIG. 4.

FIG. 6 is a view illustrating an example of a time chart in a case where abnormality of power shutdown is sensed in the connection control of the hydrogen tank illustrated in FIG. 4.

At the time of power shutdown, STEP 4 to STEP 6 described above are executed at the same time.

What is claimed is:

1. A hydrogen supply system comprising:

a hydrogen tank that is attachable and detachable;

a hydrogen consumption device that consumes hydrogen of the hydrogen tank; and a control device, wherein:

the hydrogen consumption device includes an attaching-detaching mechanism that attaches and detaches the hydrogen tank with respect to the hydrogen consumption device;

the attaching-detaching mechanism includes a motor that controls attaching and detaching of the hydrogen tank with respect to the hydrogen consumption device, and a hydrogen tank biasing mechanism that transmits a biasing force to the hydrogen tank; and the control device performs a stop control action comprising stopping the motor of the attaching-detaching mechanism when abnormality is sensed in at least one of the hydrogen tank and the hydrogen consumption device, in a state in which the hydrogen tank is connected to the hydrogen consumption device and the hydrogen is supplied from the hydrogen tank to the hydrogen consumption device.

2. The hydrogen supply system according to claim 1, wherein:

the attaching-detaching mechanism includes a lock portion that latches the hydrogen tank at a predetermined position when movement of the hydrogen tank is restricted;

the control device performs lock control of bringing the hydrogen tank to a lock state by the lock portion when the abnormality is sensed in at least one of the hydrogen tank and the hydrogen consumption device; and the control device performs the stop control after performing the lock control.

3. The hydrogen supply system according to claim 2, wherein:

the attaching-detaching mechanism includes an attaching-detaching unit that allows the hydrogen tank to be attached and detached;

the attaching-detaching unit includes a movable portion that moves the hydrogen tank through control of the motor, and a fitting portion to be fitted to the hydrogen tank;

the movable portion includes an engagement recessed portion engageable with the lock portion; and the lock portion is a lock pin.

4. The hydrogen supply system according to claim 3, wherein:

the hydrogen tank includes a first connection portion;

the fitting portion includes a second connection portion; and at the time of fitting the hydrogen tank to the fitting portion, the first connection portion of the hydrogen tank and the second connection portion of the fitting portion are connected.

5. The hydrogen supply system according to claim 4, wherein:

the first connection portion is an on-off valve; and the second connection portion is a push rod.

* * * * *